United States Patent
Mathew et al.

(10) Patent No.: US 12,553,221 B2
(45) Date of Patent: Feb. 17, 2026

(54) SYSTEMS AND METHODS FOR WEAR ASSESSMENT OF GROUND ENGAGING TOOLS

(71) Applicant: Caterpillar Inc., Peoria, IL (US)

(72) Inventors: Shawn Mathew, Savoy, IL (US); John Paul Atkinson, Pittsburgh, PA (US); Norman Keith Lay, Baden, PA (US); Lawrence Mianzo, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 255 days.

(21) Appl. No.: 18/536,189

(22) Filed: Dec. 11, 2023

(65) Prior Publication Data
US 2025/0188715 A1    Jun. 12, 2025

(51) Int. Cl.
*G06T 7/12* (2017.01)
*E02F 9/26* (2006.01)
*G06T 7/00* (2017.01)

(52) U.S. Cl.
CPC .............. *E02F 9/268* (2013.01); *G06T 7/001* (2013.01); *G06T 7/12* (2017.01); *G06T 2207/20081* (2013.01); *G06T 2207/20084* (2013.01); *G06T 2207/30164* (2013.01)

(58) Field of Classification Search
CPC .......... E02F 9/268; E02F 9/267; G06T 7/001; G06T 7/12; G06T 2207/20081; G06T 2207/20084; G06T 2207/30164
See application file for complete search history.

(56) References Cited

U.S. PATENT DOCUMENTS

| | | | |
|---|---|---|---|
| 8,411,930 B2 | 4/2013 | Ridley et al. | |
| 8,860,760 B2 | 10/2014 | Chen et al. | |
| 10,044,933 B2 | 8/2018 | Oota et al. | |
| 10,249,060 B2 | 4/2019 | Wagner et al. | |
| 10,339,667 B2 | 7/2019 | Tafazoli Bilandi et al. | |
| 10,689,830 B2 | 6/2020 | Hageman et al. | |
| 11,138,718 B2 | 10/2021 | Campomanes et al. | |
| 2017/0234775 A1 | 8/2017 | Finch et al. | |
| 2018/0165884 A1 | 6/2018 | Wagner et al. | |
| 2020/0378091 A1 | 12/2020 | Hyde et al. | |
| 2020/0393303 A1 | 12/2020 | Betournay et al. | |
| 2021/0262204 A1 | 8/2021 | Tafazoli Bilandi et al. | |

(Continued)

FOREIGN PATENT DOCUMENTS

| | | |
|---|---|---|
| CN | 111739029 A | 10/2020 |
| CN | 112686206 A | 4/2021 |

(Continued)

*Primary Examiner* — Juan M Guillermety

(57) ABSTRACT

A technique is directed to methods and systems for assessing wear for a ground engaging tool (GET), such as a tooth on a bucket on a machine. A GET monitoring system can utilize convolutional neural networks for detecting individual instances of GETs in an image. The GET monitoring system can records the initial state of a GET on a bucket during a calibration process. After calibration, the GET monitoring system can estimate how much the GET has worn down, as length or surface area, since the GET was installed. In some embodiments, as a machine operates the motion of the machine can induce perspective distortion on the captured images of the GETs. The GET monitoring system can correct for perspective distortion, induced by bucket motion, by building a motion history map of the GET.

20 Claims, 11 Drawing Sheets

(56) References Cited

U.S. PATENT DOCUMENTS

| | | |
|---|---|---|
| 2022/0018098 A1 | 1/2022 | Nakagi et al. |
| 2022/0136217 A1 | 5/2022 | Petrany et al. |
| 2022/0136218 A1 | 5/2022 | Ram et al. |
| 2022/0251807 A1 | 8/2022 | Mianzo et al. |
| 2022/0284609 A1* | 9/2022 | Shree .................. G06T 7/33 |
| 2023/0351581 A1 | 11/2023 | Alan et al. |

FOREIGN PATENT DOCUMENTS

| | | |
|---|---|---|
| CN | 114658060 A | 6/2022 |
| CN | 114820451 A | 7/2022 |
| JP | 5752631 B2 | 7/2015 |
| JP | 2021127601 A | 9/2021 |
| KR | 101563722 B1 | 10/2015 |
| WO | 2020237324 A1 | 12/2020 |
| WO | 2022018513 A1 | 1/2022 |
| WO | 2022020635 A1 | 1/2022 |
| WO | 2022087661 A1 | 5/2022 |

* cited by examiner

000# SYSTEMS AND METHODS FOR WEAR ASSESSMENT OF GROUND ENGAGING TOOLS

TECHNICAL FIELD

This patent application is directed to machine maintenance, and more specifically, to machine part wear assessment.

BACKGROUND

As equipment is used, certain parts progressively wear out. This wear at some point starts to degrade performance of the equipment such that it is economically preferable to replace the parts. For example, worn ground engaging tools (e.g., excavator teeth) lead to higher fuel consumption, lower productivity, and excess wear to other components.

Identifying the optimal point in time to replace a worn part can be challenging. For example, estimating the degree of wear for a part and extrapolating how that wear will progress is a difficult task and typically includes time-consuming physical measurements. Determining the economic tradeoff between the cost of replacing a part and continuing to operate with a worn part should take into account many variables, many of which can vary by machine and operating circumstances. Equipment can experience different performance degradation under different circumstances. For example, digging in heavy clay may benefit from newer bucket tips, whereas one digging in sand would experience little benefit. Thus, there is a need to accurately predict wear and estimate the part replacement timing. Companies have implemented various techniques to solve this problem. For example, Patent Publication No. US20220018098A1 describes a method for calibrating an inertial measurement device attached to a work device included in a work machine (e.g., hydraulic excavator). However, this method is only directed to calibrating a machine and does not describe determining wear measurements of a machine part. Thus, there are still opportunities to improve image recognition for part wear assessment. The example systems and methods described herein are directed toward overcoming one or more of the deficiencies described above.

SUMMARY

In some aspects, the techniques described herein relate to a method for determining wear estimation of a machine part, the method including: determining a first size of the machine part attached to a machine based on a measurement of the machine part; receiving at least one image of the machine part captured by at least one camera attached to the machine; determining a second size of the machine part by: generating a segmentation polygon around the machine part in the at least one image; identifying a top midpoint and a bottom midpoint of the segmentation polygon in image pixel-space; calculating a distance from the top midpoint to the bottom midpoint; and determining a wear estimate of the machine part by comparing the first size to the second size.

In some aspects, the techniques described herein relate to a method, further including: determining a perspective distortion scaling factor to correct size distortion of the machine part in images as the machine part moves toward and away from the at least one camera, wherein the perspective distortion scaling factor is based on a surface area in square pixels of the machine part and a distance of the machine part from the at least one camera; and determining the second size of the machine part as a function of the perspective distortion scaling factor. In some aspects, the techniques described herein relate to a method, further including: generating an occluded class and an un-occluded class for one or more types of machine parts; and training a neural network model to identify occluded machine parts in a plurality of images based on the occluded class and the un-occluded class for the one or more types of machine parts. In some aspects, the techniques described herein relate to a method, further including: training a part detection model to identify machine parts based on a plurality of images that include annotated machine parts; inputting the at least one image into the trained part detection model; and generating the segmentation polygon around the machine part in the at least one image. In some aspects, the techniques described herein relate to a method, further including: generating a report of the wear estimate of the machine part, wherein the report includes a wear percentage of the machine part.

In some aspects, the techniques described herein relate to a method, further including: calibrating a part detection model by capturing images of the machine part at two or more pre-defined positions relative the at least one camera attached to the machine; receiving, by the part detection model, a plurality of images in a predetermined time scope; identifying, by the part detection model, one or more detections of the machine part in a number of images of the plurality of images; and in response to the number of images being above a threshold, determining the one or more detections are positive detections of the machine part. In some aspects, the techniques described herein relate to a method, wherein the machine part is a ground engaging tool attached to a bucket of the machine, and wherein the first size and the second size of the machine part are a length of the machine part or a surface area of the machine part.

In some aspects, the techniques described herein relate to a non-transitory computer-readable medium storing instructions that, when executed by a computing system, cause the computing system to perform operations for determining wear estimation of a machine part, the operations including: determining a first size of the machine part attached to a machine based on a measurement of the machine part; receiving at least one image of the machine part captured by at least one camera attached to the machine; determining a second size of the machine part by: generating a segmentation polygon around the machine part in the at least one image; identifying a top midpoint and a bottom midpoint of the segmentation polygon in image pixel-space; calculating a distance from the top midpoint to the bottom midpoint; and determining a wear estimate of the machine part by comparing the first size to the second size.

In some aspects, the techniques described herein relate to a non-transitory computer-readable medium, wherein the operations further include: determining a perspective distortion scaling factor to correct size distortion of the machine part in images as the machine part moves toward and away from the at least one camera, wherein the perspective distortion scaling factor is based on a surface area in square pixels of the machine part and a distance of the machine part from the at least one camera; and determining the second size of the machine part as a function of the perspective distortion scaling factor.

In some aspects, the techniques described herein relate to a non-transitory computer-readable medium, wherein the operations further include: generating an occluded class and an un-occluded class for one or more types of machine parts;

and training a neural network model to identify occluded machine parts in a plurality of images based on the occluded class and the un-occluded class for the one or more types of machine parts.

In some aspects, the techniques described herein relate to a non-transitory computer-readable medium, wherein the operations further include: training a part detection model to identify machine parts based on a plurality of images that include annotated machine parts; inputting the at least one image into the trained part detection model; and generating the segmentation polygon around the machine part in the at least one image. In some aspects, the techniques described herein relate to a non-transitory computer-readable medium, wherein the operations further include: generating a report of the wear estimate of the machine part, wherein the report includes a wear percentage of the machine part.

In some aspects, the techniques described herein relate to a non-transitory computer-readable medium, wherein the operations further include: calibrating a part detection model by capturing images of the machine part at two or more pre-defined positions relative the at least one camera attached to the machine; receiving, by the part detection model, a plurality of images in a predetermined time scope; identifying, by the part detection model, one or more detections of the machine part in a number of images of the plurality of images; and in response to the number of images being above a threshold, determining the one or more detections are positive detections of the machine part. In some aspects, the techniques described herein relate to a non-transitory computer-readable medium, wherein the machine part is a ground engaging tool attached to a bucket of the machine, and wherein the first size and the second size of the machine part are a length of the machine part or a surface area of the machine part.

In some aspects, the techniques described herein relate to a system including: one or more processors; and one or more memories storing instructions that, when executed by the one or more processors, cause the system to perform a process for determining wear estimation of a machine part, the process including: determining a first size of the machine part attached to a machine based on a measurement of the machine part; receiving at least one image of the machine part captured by at least one camera attached to the machine; determining a second size of the machine part by: generating a segmentation polygon around the machine part in the at least one image; identifying a top midpoint and a bottom midpoint of the segmentation polygon in image pixel-space; calculating a distance from the top midpoint to the bottom midpoint; and determining a wear estimate of the machine part by comparing the first size to the second size.

In some aspects, the techniques described herein relate to a system, wherein the process further includes: determining a perspective distortion scaling factor to correct size distortion of the machine part in images as the machine part moves toward and away from the at least one camera, wherein the perspective distortion scaling factor is based on a surface area in square pixels of the machine part and a distance of the machine part from the at least one camera; and determining the second size of the machine part as a function of the perspective distortion scaling factor.

In some aspects, the techniques described herein relate to a system, wherein the process further includes: generating an occluded class and an un-occluded class for one or more types of machine parts; and training a neural network model to identify occluded machine parts in a plurality of images based on the occluded class and the un-occluded class for the one or more types of machine parts.

In some aspects, the techniques described herein relate to a system, wherein the process further includes: training a part detection model to identify machine parts based on a plurality of images that include annotated machine parts; inputting the at least one image into the trained part detection model; and generating the segmentation polygon around the machine part in the at least one image.

In some aspects, the techniques described herein relate to a system, wherein the process further includes: generating a report of the wear estimate of the machine part, wherein the report includes a wear percentage of the machine part, wherein the machine part is a ground engaging tool attached to a bucket of the machine, and wherein the first size and the second size of the machine part are a length of the machine part or a surface area of the machine part.

In some aspects, the techniques described herein relate to a system, wherein the process further includes: calibrating a part detection model by capturing images of the machine part at two or more pre-defined positions relative the at least one camera attached to the machine; receiving, by the part detection model, a plurality of images in a predetermined time scope; identifying, by the part detection model, one or more detections of the machine part in a number of images of the plurality of images; and in response to the number of images being above a threshold, determining the one or more detections are positive detections of the machine part.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1A:
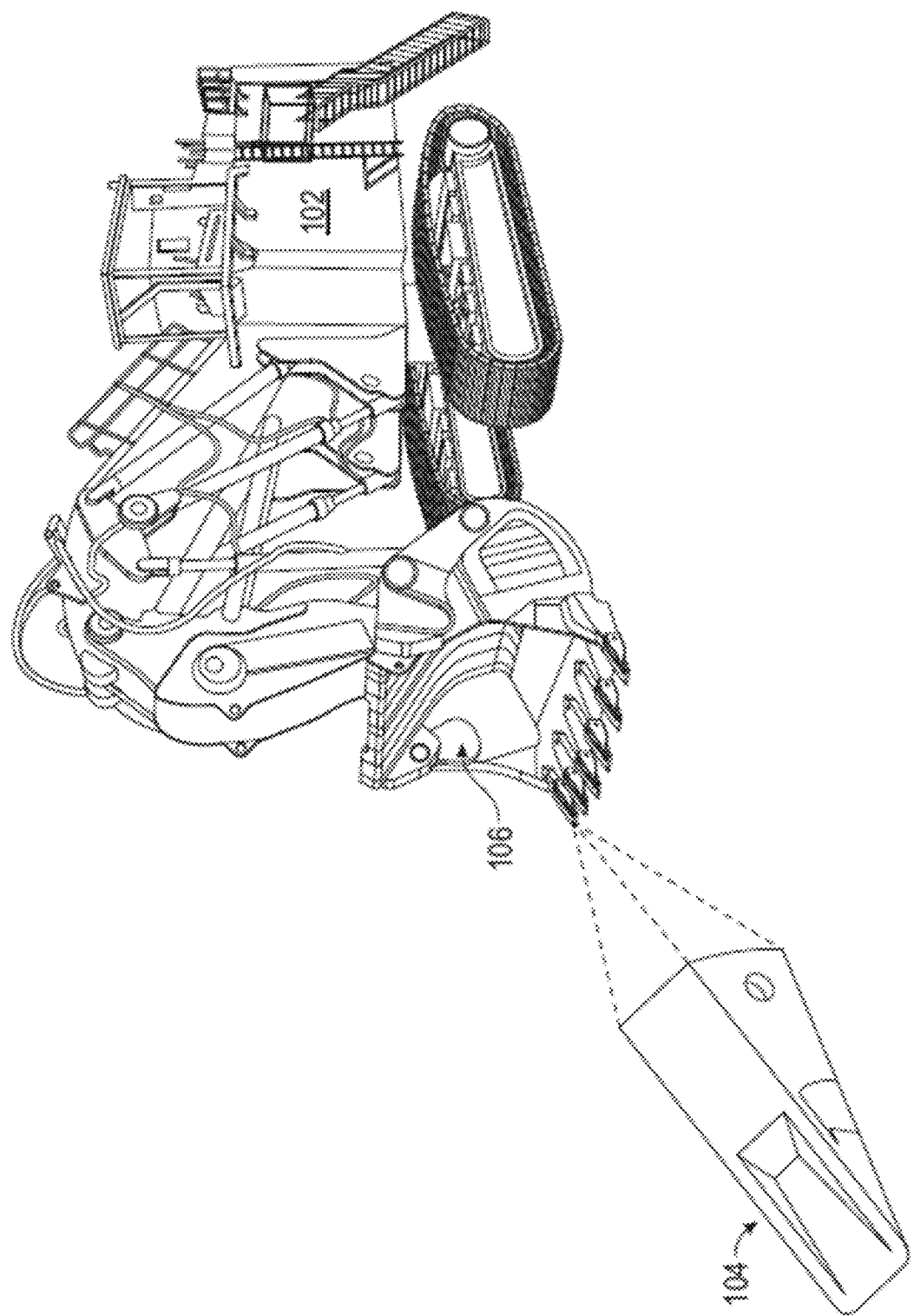
FIG. 1A illustrates a ground engaging tool on a bucket of a loading machine according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for assessing wear for a part (e.g., a ground engaging tool (GET), such as a tooth on a bucket) on a machine, such as an excavator. This capability applies to GETs that degrade through wear that is visually detectable as a change in the shape or appearance of the GET. A GET monitoring system can utilize convolutional neural networks (CNN) for detecting individual instances of GETs in an image. The neural network is trained using human annotated or machine generated (synthetic) annotated images. The GET monitoring system performs instance segmentation of a GET using color images, composite color images, depth images, and/or infrared (IR) images.

The GET monitoring system can determine the initial state (e.g., damaged, new, missing, etc.) of a GET on a bucket after installation and perform a calibration process. After calibration, the GET monitoring system can estimate how much the GET has worn down since the GET was installed. The GET monitoring system can determine the amount of wear of the GET using segmentation polygon detections of the GET in conjunction with depth measurements from a stereo camera(s) to estimate the current length of the GET. In some embodiments, as a machine operates (e.g., digging, loading, traveling, etc.), the motion of the machine can induce perspective distortion on the captured images of the GETs. The GET monitoring system can correct for perspective distortion, induced by bucket motion, by measuring GET surface area in pixel space.

Figure 1B:
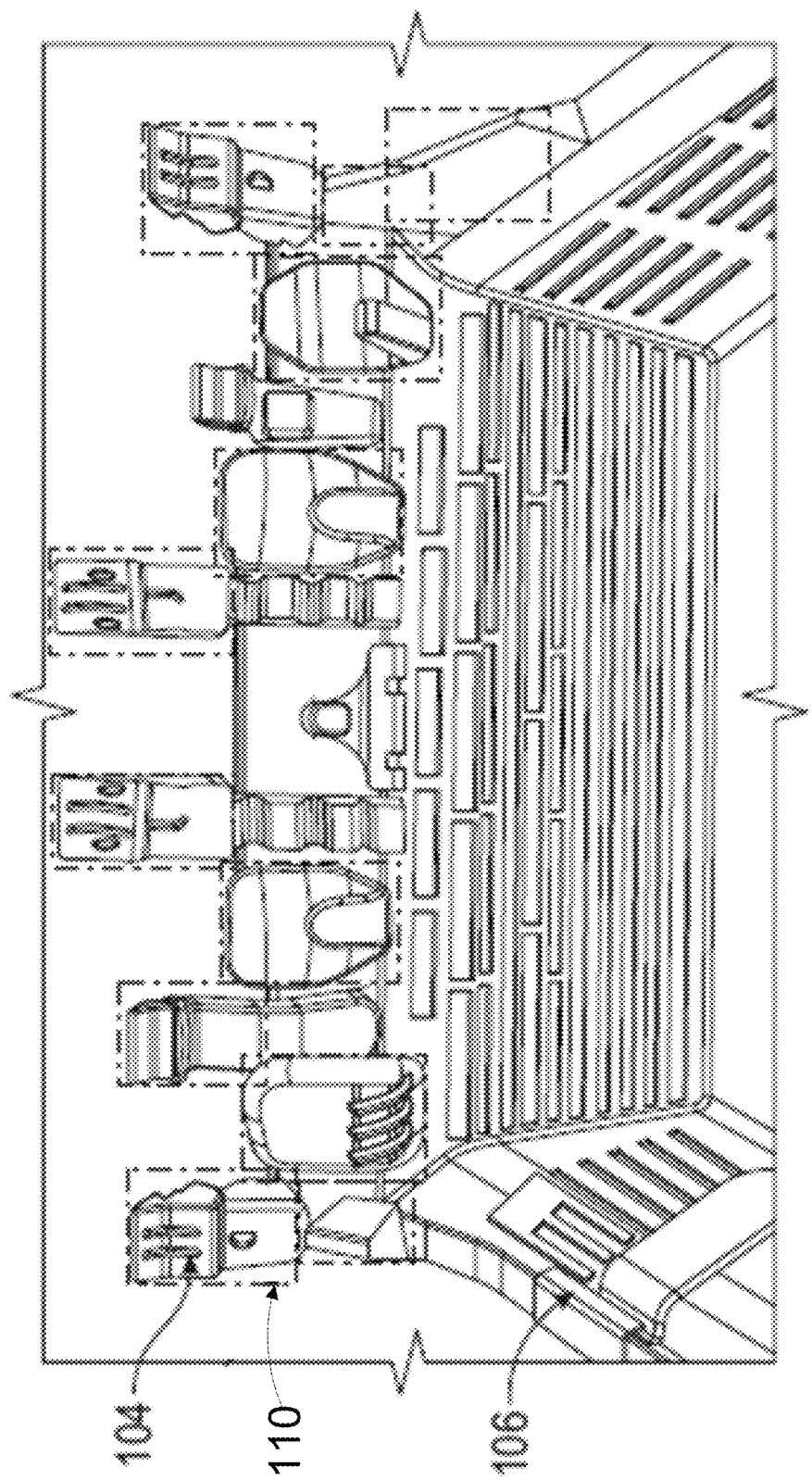
FIG. 1B illustrates a bucket of a loading machine with identified ground engaging tools according to some embodiments of the disclosed technology.

FIG. 1A illustrates a ground engagement tool on a bucket of a loading machine according to some embodiments of the disclosed technology. A ground engaging tool 104 (e.g., machine part, such as an excavator tooth) is attached to a bucket 106 of a loading machine 102 (e.g., excavator). FIG. 1B illustrates a bucket 106 of a loading machine with ground engaging tools 104 included in polygons 110 according to some embodiments of the disclosed technology.

Figure 2A:
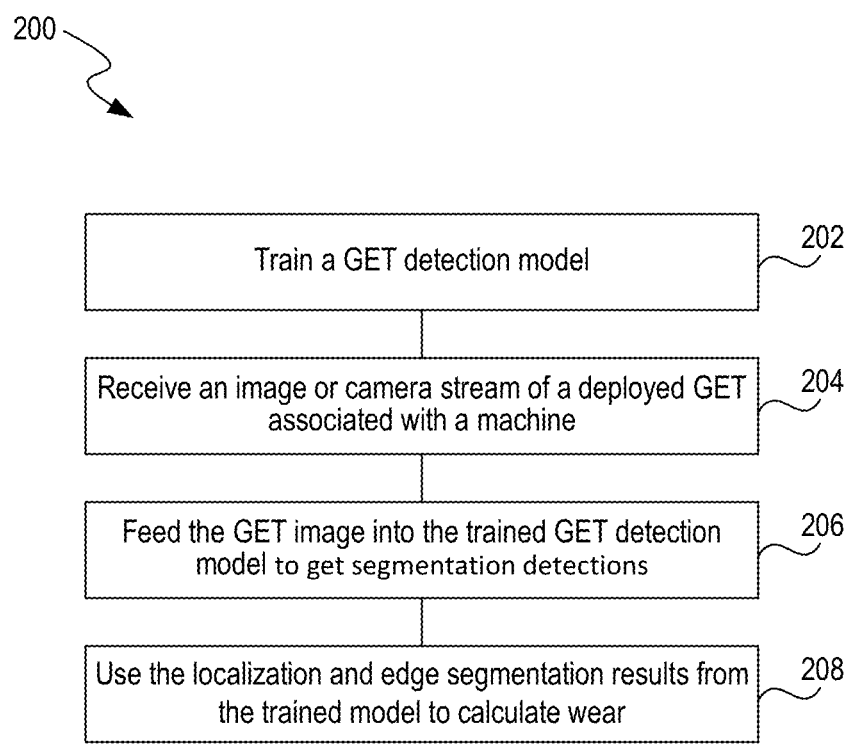
FIG. 2A is a flow diagram showing a method for ground engaging tool detection according to some embodiments of the disclosed technology.

FIG. 2A is a flow diagram showing a method 200 for ground engaging tool detection according to some embodiments of the disclosed technology. The method 200 includes utilizing convolutional neural networks (CNN) for detecting individual instances of GETs using a neural network. The neural network is trained using human annotated or machine generated (synthetic) annotated images. The GET monitoring system performs instance segmentation of a GET using color images, composite color images, depth images, and/or infrared (IR) images. The instance segmentation is performed using neural networks, specifically instance segmentation with deep convolutional neural networks. Instance segmentation can provide various benefits, such as (1) leveraging depth in addition to color to segment individual GETs; and (2) providing an edge segmentation and precise localization in an image for individual GETs that the system detects.

At step 202, the GET monitoring system receives a trained GET detection model (e.g., machine learning, neural network, etc.). The GET detection model is trained based on images that include GETs. In the training images, each individual instance of a GET is annotated by a human or the images are machine generated annotated images with synthetic data where annotations are generated by simulation models. At step 204, the GET monitoring system receives a GET image or camera stream of a deployed GET (e.g., a GET installed on a machine) associated with a machine. At step 206, the GET monitoring system feeds the GET image or camera stream into the trained GET detection model to get segmentation detections.

At step 208, the GET monitoring system utilizes the localization and edge segmentation results from the trained model to calculate the wear of the GET. The GET monitoring system utilizes the trained GET detection model at runtime for predicting instance segmentation of a GET from the image or camera stream. For example, a neural network is used at runtime with fixed trained weights to predict instance segmentations of a GET from a camera stream. The result of the neural network's inference at runtime are polygons (e.g., polygon 110 of FIG. 1B) that give a precise localization and edge segmentation in the image in pixel-space. Based on the instance segmentation of GET, the GET monitoring system provides a precise localization and edge segmentation of each GET of the bucket of the work machine.

Figure 2B:
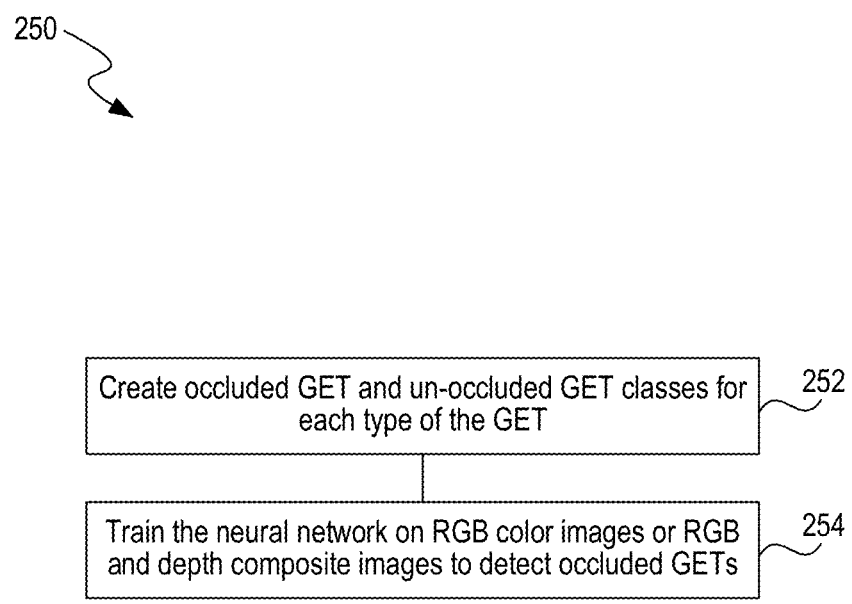
FIG. 2B is a flow diagram showing a method for detecting occluded and un-occluded ground engaging tools according to some embodiments of the disclosed technology.

FIG. 2B is a flow diagram showing a method 250 for detecting occluded and un-occluded ground engaging tools according to some embodiments of the disclosed technology. The GET monitoring system can determine which GETs on a loading machine are occluded (e.g., by dirt or debris) or un-occluded GETs using a neural network. The GET monitoring system can execute method 400 to selectively exclude GET detections that are determined to be occluded by dirt from post-processing algorithms that need to detect an un-occluded GET. GET detections that are determined to be occluded via post-processing algorithms are excluded from wear estimation.

The GET monitoring system trains the neural network to detect occluded GETs. When annotating training data for a neural network to detect occluded GETs, the GET monitoring system adds an attribute to GET annotations that, in addition to indicating the class of the GET, denotes whether that GET is occluded by dirt. At step 252, the GET monitoring system creates an occluded GET class and un-occluded GET class for each type (e.g., bucket tips, lip shrouds, side shrouds, etc.) of GET, while training data is generated from annotations. At step 254, the GET monitoring system trains the neural network on RGB (red, green, and blue) color images or RGB and depth composite images to detect occluded GETs. At inference time, the GET monitoring system uses the detected GETs class prediction to make a distinction between an occluded and un-occluded GET.

Figure 3:
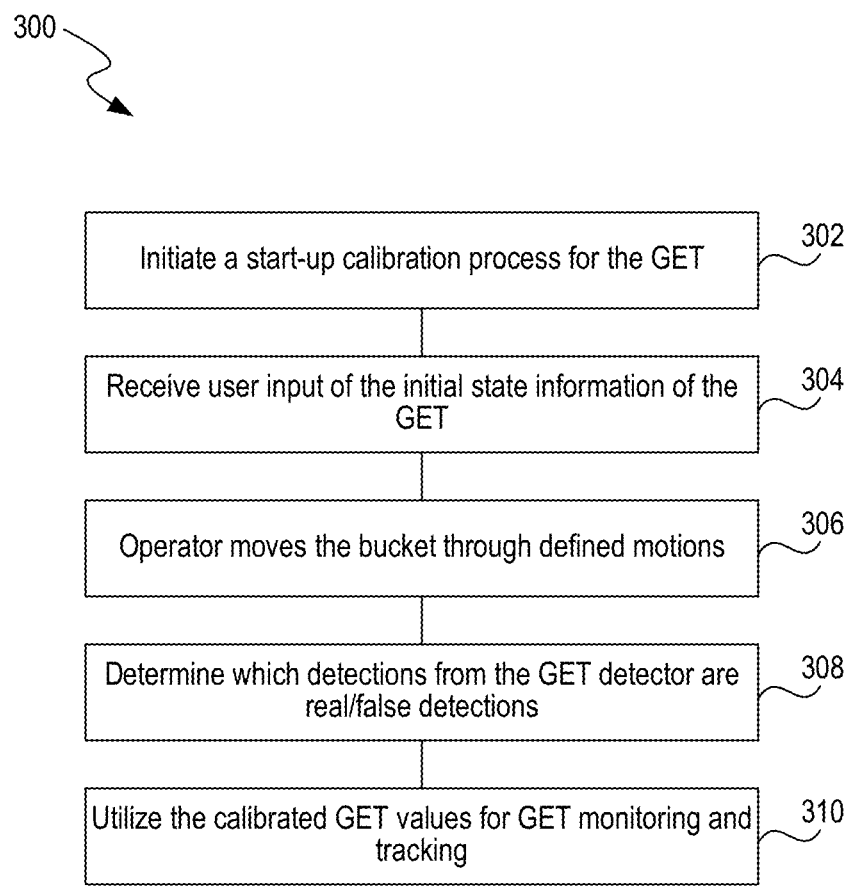
FIG. 3 is a flow diagram showing a method for calibrating a ground engaging tool monitoring system according to some embodiments of the disclosed technology.

FIG. 3 is a flow diagram showing a method 300 for calibrating a ground engaging tool monitoring system according to some embodiments of the disclosed technology. The initial state off a GET is entered during calibration (which is done at installation time or at a GET changeout) and is expected to be brand new GETs. During operation, the GET monitoring system can constantly monitor the GETs for changes. During system operation, it is possible that the system encounters false detections. To avoid false detections, a calibration is performed when the GET is in the cleanest (new) state. The GET monitoring system can record GET data using cameras mounted on the machine and user input to record the current state of the GET. In addition to reducing false detections, the data entered during the calibration process can help generate wear alarms, breakage alarms, and loss alarms.

At step 302, the GET monitoring system initiates a start-up calibration process for the GET. In some cases, a user (e.g., machine operator, technician, etc.) initiates the calibration process.

At step 304, the GET monitoring system receives user input of the initial state information of the GET. The initial state information can include the number of bucket tips, lip shrouds, side shrouds, the dimensions of the GET during installation, and the dimensions of a completely worn GET (e.g., needing to be replaced before future operations). For example, it is important to know when the GET reaches a 100% worn condition, so that the GET can be replaced. By knowing the initial state and the 100% worn dimension of a GET, the GET monitoring system, which measures the GET via one or more frames of a camera stream, can accurately alert the operator that the system has detected a worn (e.g., 1%-100% worn) GET. At step 306, an operator of the machine can move the bucket through defined motions to detect the GET at various positions. The GET monitoring system can aggregate the detections from the GET detector on a stationary loading machine. The GET monitoring system can utilize a neural network detector to detect a GET (as described in FIG. 2). During the calibration process, the GET monitoring system can execute a GET detector on one or more single frames in a predetermined time scope or a predetermined number of images. The system determines detections from the GET detector that are required to be tracked throughout operations of the system.

At step 308, the GET monitoring system determines which detections from the GET detector are real detections that should be tracked throughout the systems operations. Detections are analyzed using an association process across all image frames in the predetermined time scope. If a detection is present for X % of all the frames in the time window, it is taken to be a real GET that should be tracked throughout system operation. Detections that are present for less than X % of the frames in the window are taken to be false positives and are discarded. The real detections of the GET are ordered from left to right, or alternatively can be ordered 0 to N for each class of GET. At step 310, the GET monitoring system utilizes the calibrated GET values for GET monitoring, tracking or association, and are also utilized for error checking. Moreover, the calibrated values can be utilized to produce wear alarms, breakage alarms, and loss alarms.

Figure 4:
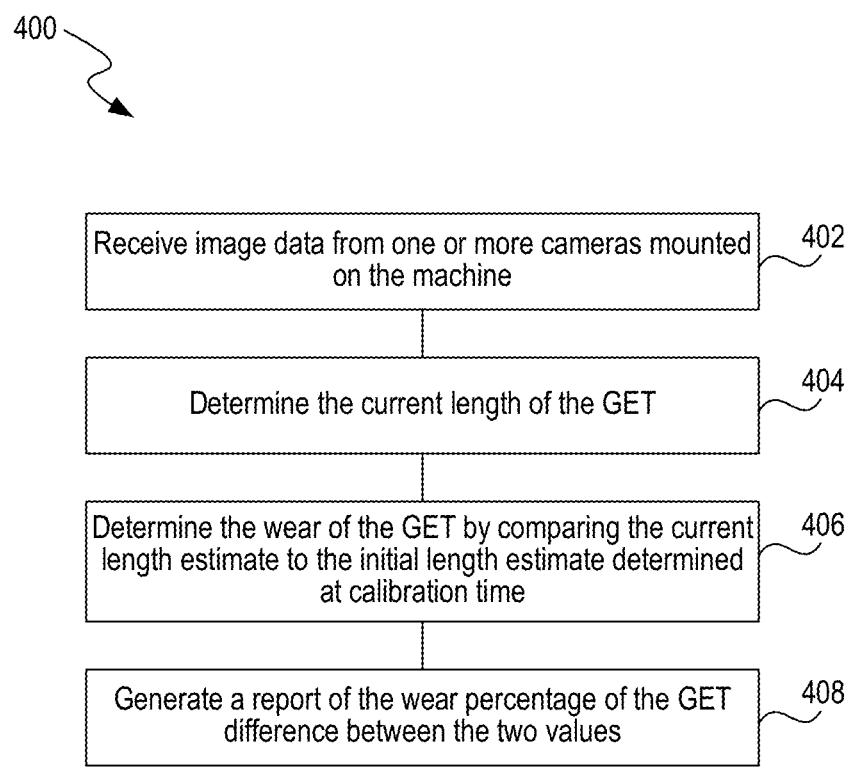
FIG. 4 is a flow diagram showing a method for determining wear of a ground engaging tool since installation according to some embodiments of the disclosed technology.

FIG. 4 is a flow diagram showing a method 400 for determining wear of a ground engaging tool since installation according to some embodiments of the disclosed technology. The GET monitoring system can estimate how much a GET of a loading machine has worn down since the GET was installed. The GET monitoring system can determine the amount of wear of the GET using segmentation polygon detections of the GET in conjunction with depth measurements from a stereo camera(s) to estimate the current length of the GET. Polygon segmentation detections from a neural network are tracked throughout normal system operation. In some embodiments, an initial length of a GET is determined via a reading from configuration file supplied by an operator of the machine. In some embodiments, an initial length of a GET is determined during a calibration process as described in FIG. 3.

At step 402, the GET monitoring system receives image data from one or more cameras (e.g., stereo cameras) mounted on the machine. At step 404, the GET monitoring system determines the current length of the GET. For each image frame where a GET detection is successfully associated (as described in FIG. 3), the length of that GET is estimated. The GET monitoring system performs length estimation by identifying the top and bottom (x, y) midpoints of the polygon detection in image pixel-space and projecting these points into a 3-dimension (3D) model using the (x, y) midpoints and their corresponding disparity value from a stereo disparity map. The GET monitoring system can compute the Euclidean distance between the two 3D points.

At step 406, the GET monitoring system determines the wear of the GET by comparing the current length estimate to the initial length estimate determined at calibration time. The current length estimate that is used for comparison may be an instantaneous length estimate or, in order to reduce estimate noise, a moving average of the last N length estimates. For example, in order to reduce estimate noise, the depth value that is used for computing length estimates may be an average depth determined by a neighborhood of disparities around the top and bottom (x, y) midpoints, rather than the depth corresponding to the disparity value exactly at the (x, y) midpoint. In some implementations, the GET monitoring system can determine the area of the GET based on the length estimates.

At step 408, the GET monitoring system generates a report of the wear percentage of the GET difference between the current length estimate and the initial length estimate. Utilizing method 400 results in high accuracy wear estimation through 3D length measurements that does not suffer from the nonlinear effects of perspective distortion.

Figure 5:
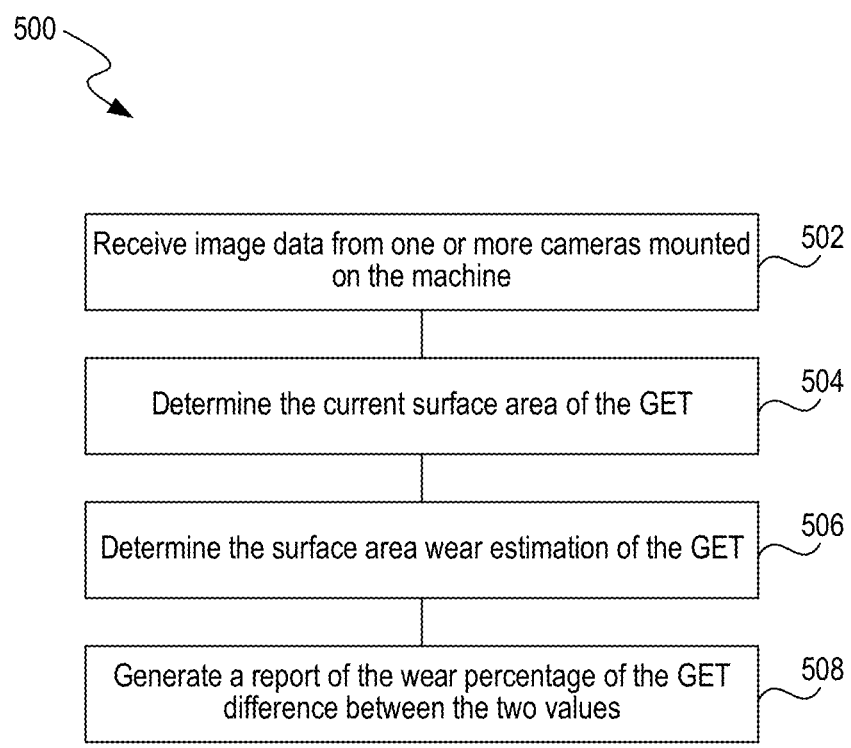
FIG. 5 is a flow diagram showing a method for determining surface area wear of a ground engaging tool since installation according to some embodiments of the disclosed technology.

FIG. 5 is a flow diagram showing a method 500 for determining surface area wear of a ground engaging tool since installation according to some embodiments of the disclosed technology. The GET monitoring system can determine how much a GET has worn down since it was last changed based on surface area derived using segmentation polygon detections of the GET. In some embodiments, an initial area of a GET is determined via a reading from configuration file supplied by an operator of the machine. The initial area estimated during calibration time can be undistorted using a correction function. The area of a GET is measured in pixel spaces. The length of GET is measured in physical space (e.g., distance in inches). Due to the differences in pixel space measurements and physical space measurements, there is a need to correct perspective distortion between the area and length of a GET. In some embodiments, the GET monitoring system can measure surface area of a GET in physical space (using depth maps from the stereo camera).

At step 502, the GET monitoring system receives image data from one or more cameras (e.g., stereo cameras) mounted on the machine. At step 504, the GET monitoring system determines the current surface area of the GET. The GET monitoring system can perform measurements of the GET during normal system monitoring operations. The GET monitoring system can determine the current surface area using the dimensions of the segmentation polygon detections of the GET (e.g., length estimates determined in FIG. 4).

At step 506, the GET monitoring system determines the surface area wear estimation of the GET. The GET monitoring system compares the initial area with the determined current surface area of the GET. In some embodiments, system measurements may be compared directly against nominal areas estimated by the perspective distortion correction functions (as described in FIG. 6A). The GET monitoring system can assign an identifier (ID) to each GET. Wear is estimated as the percent change between each detection polygon's measured area and that GET ID's initial area value. The current area estimate that is used for comparison may be an instantaneous area estimate or, in order to reduce estimate noise, a moving average based on the last N length estimates. At step 508, the GET monitoring system generates a report of the wear percentage of the GET difference between the current surface area and the initial area.

Figure 6A:
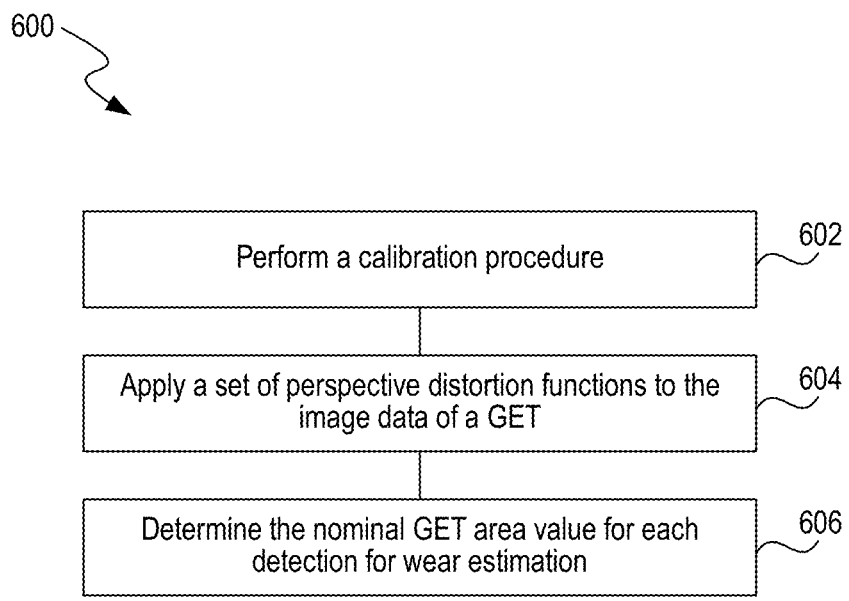
FIG. 6A is a flow diagram showing a method for correcting perspective distortion of surface area wear measurements of a ground engaging tool according to some embodiments of the disclosed technology.

FIG. 6A is a flow diagram showing a method for correcting perspective distortion of surface area wear measurements of a ground engaging tool according to some embodiments of the disclosed technology. As a machine operates (e.g., digging, loading, traveling, etc.), the motion of the machine induces perspective distortion on the images that any cameras on the machine capture of the GETs. The GET monitoring system can correct for perspective distortion, induced by bucket motion, when measuring GET surface area in pixel space (e.g., RGB pixel space) captured by a camera mounted on the loading machine.

At step 602, the GET monitoring system can perform a calibration procedure that runs a detection algorithm on data sets of 'unworn' GET images at different bucket positions. For example, a machine operator initiates the calibration process, and moves the bucket through certain motions. This is done to develop a perspective distortion scaling factor as a function of the y-position (e.g., distance from the camera to the GET) of the GET. For example, the GET monitoring system determines the relationship between the area and Y-coordinate of a GET. The GET monitoring system can execute a trained instance segmentation network on logs of image data of a GET as a bucket moves through its full range of motion. For each detection of a GET in each image, the GET monitoring system records the area of the detected GET polygon, the GET's class, identification (ID), the lowest y-position of the detection, and the average depth of the detection. If the GET is determined to be occluded by dirt, the GET monitoring system can discard the statistics, since occluded GET detections can cause inaccurate measurements.

At step 604, after collecting the statistics for each detection across the logs of interest, the GET monitoring system can apply a set of functions to the data. The set of functions are algorithmic functions that build relationships between GETs, such as applying curve fitting algorithms to create a relationship between the surface area and the Y-coordinate. Each GET has it's own curve equation. The set of functions can contain one function per GET ID. Each function is parameterized for each GET ID by the y-position of a detection, and optionally the average depth of a detection. The set of functions can be parameterized based on the type of the GET and a subclass of the GET. The GET monitoring system can determine the surface area in square pixels of an unworn GET corresponding to the GET ID. Each type of GET can require a separate set of functions, and each subclass (e.g., different kinds of bucket teeth) of the GET can require its own set of functions.

At step 606, the GET monitoring system uses the set of functions while monitoring a GET during normal system operation to determine the nominal GET area value for each detection for wear estimation. The Get monitoring system can compare the nominal GET area value to the current area of the GET captured by an image. The GET area in square pixels can also be expressed in any unit of area measurement (e.g., squared millimeters) by relating pixels to the unit of measurement through the camera images. Utilizing method 600 results in accurate surface area measurements of GET based on the area measured with segmentation polygon predictions on an image from a neural network.

Figure 6B:
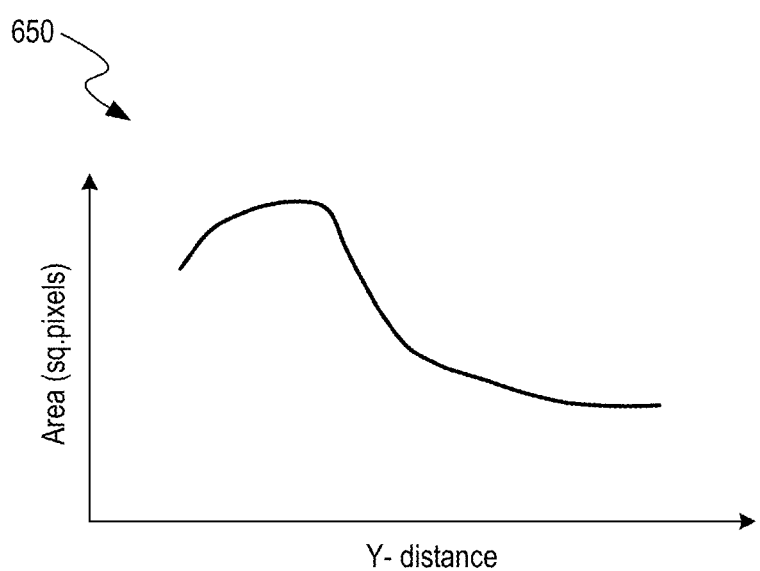
FIG. 6B illustrates a graph of a relationship of the y-distance and surface area in pixels of a ground engaging tool according to some embodiments of the disclosed technology.

FIG. 6B illustrates a graph 650 of a relationship of the y-distance and surface area in pixels of a ground engaging tool according to some embodiments of the disclosed technology. Graph 650 illustrates the relationship between the y-distance and surface area in pixels of a GET during bucket motion. This relationship is used in correcting the perspective distortion when determining the wear of the GET based on the GET surface area.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
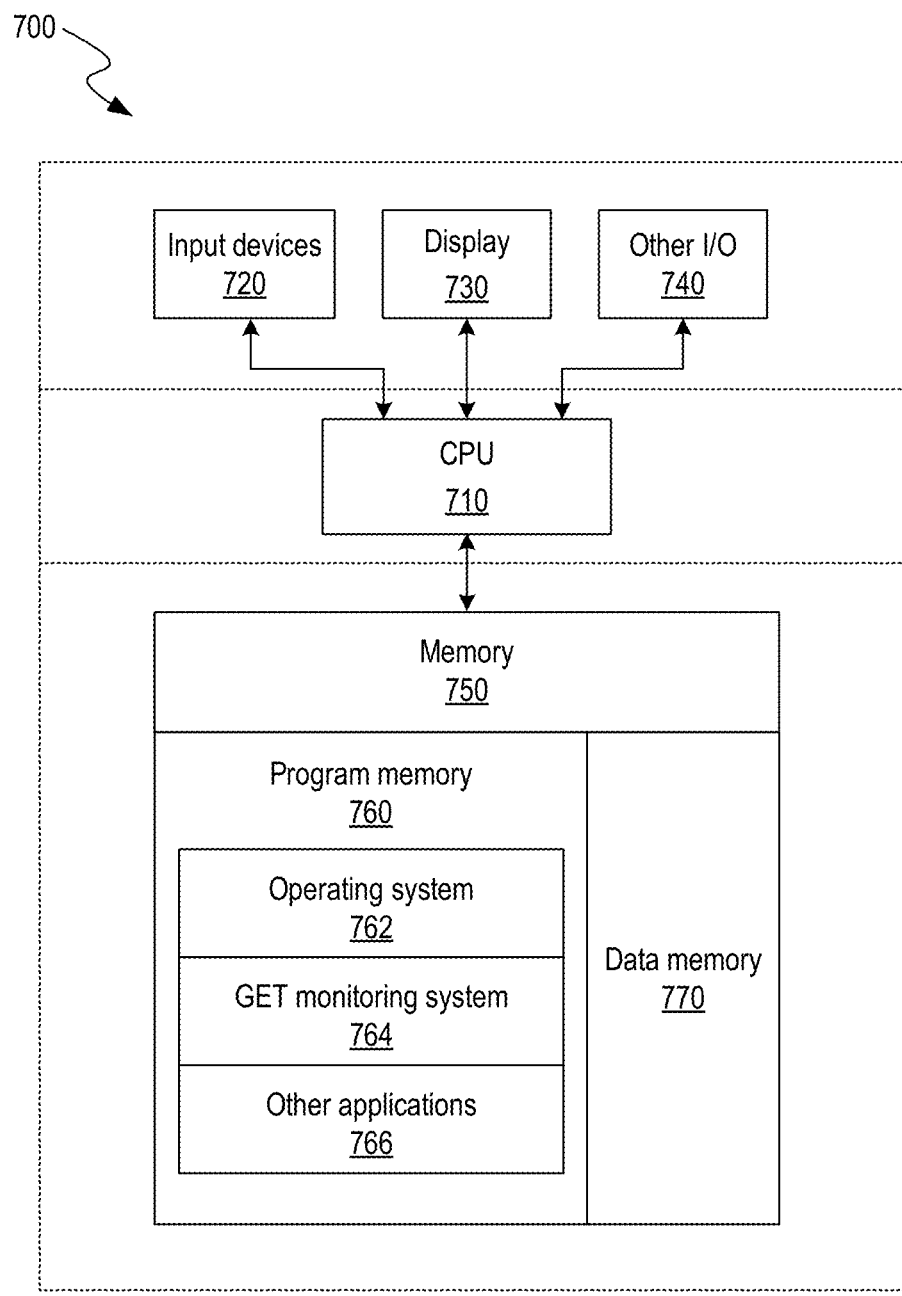
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 700 that performs wear assessment and part replacement timing optimization, for example. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, GET monitoring system 764, and other application programs 766. Memory 750 can also include data memory 770 that can include database information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 8:
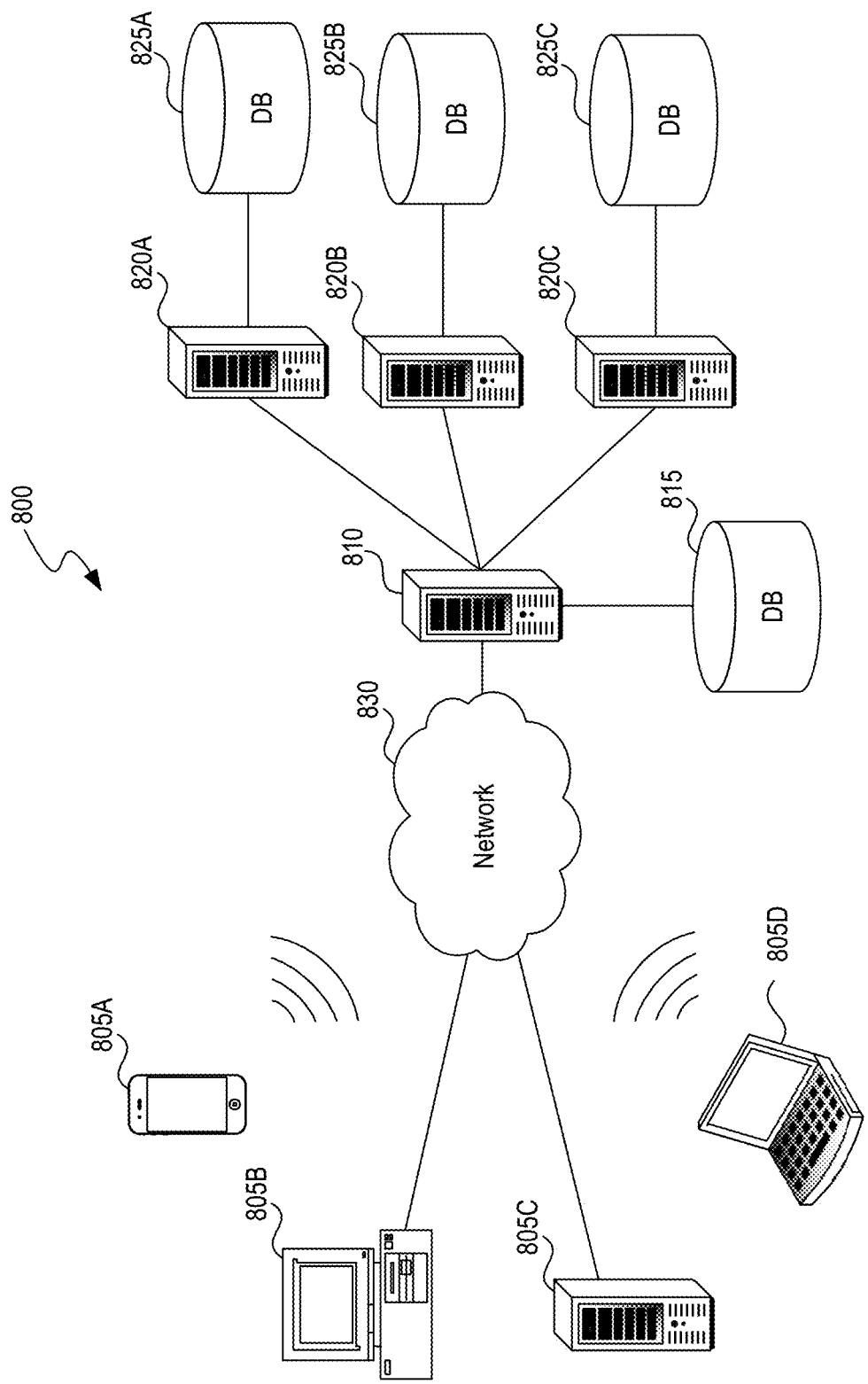
FIG. 8 is a block diagram illustrating an overview of an environment in which some implementations can operate.

FIG. 8 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 9:
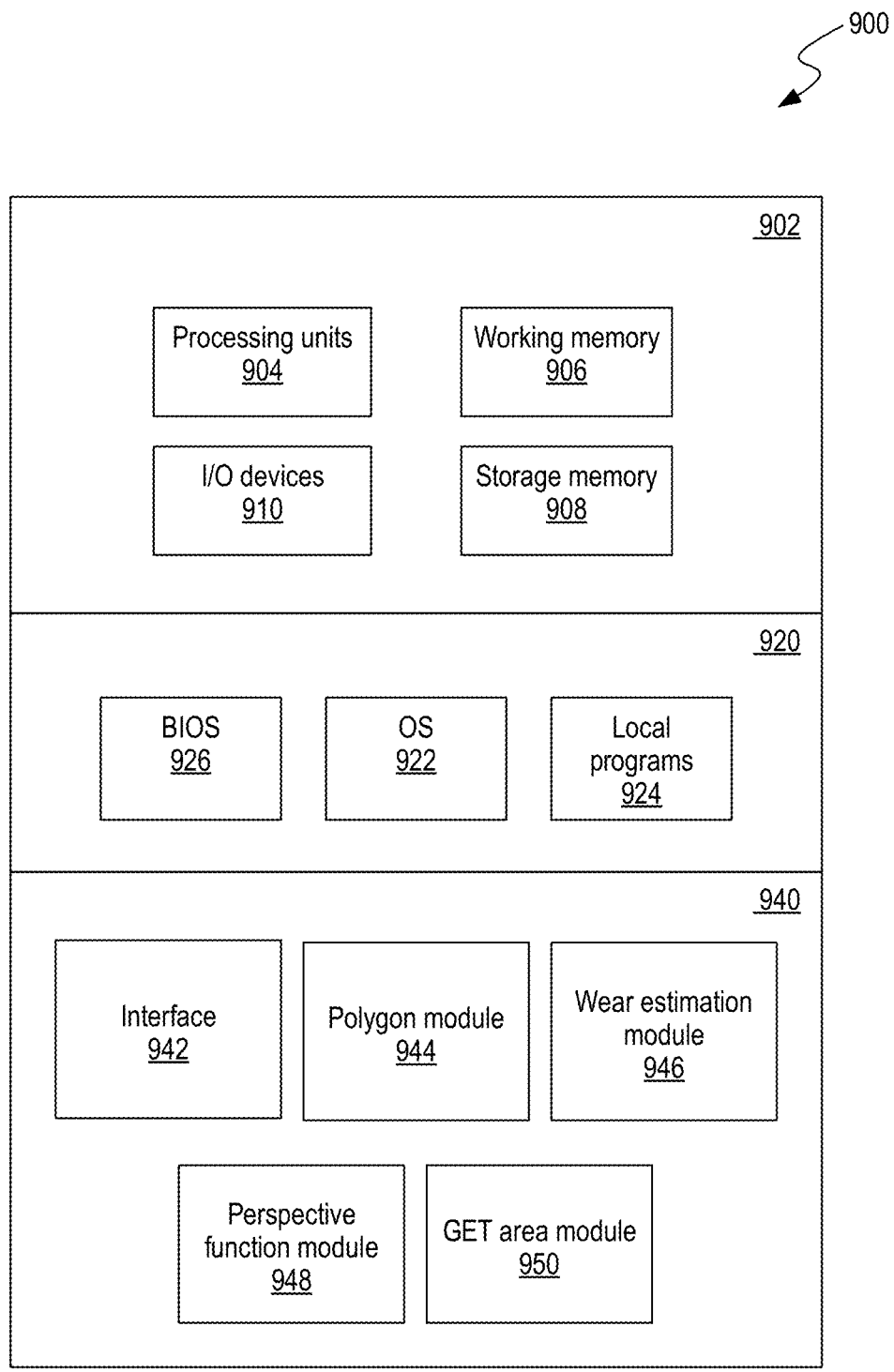
FIG. 9 is a block diagram illustrating components which, in some implementations, can be used in a system employing the disclosed technology.

FIG. 9 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include a polygon module 944 (e.g., configured to perform one or more steps of methods 200, 300, 400, 500, and/or 600), a wear estimation module 946 (e.g., configured to perform one or more steps of methods 200, 300, 400, 500, and/or 600), a perspective function module 948 (e.g., configured to perform one or more steps of methods 200, 300, 400, 500, and/or 600), a GET area module 950 (e.g., configured to perform one or more steps of methods 200, 300, 400, 500, and/or 600), and components that can be used for transferring data and controlling the specialized components, such as interface 942. In some implementations, components 900 can be in a computing system that is distributed across multiple computing devices or can be an interface to a server-based application executing one or more of specialized components 940.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

The systems and methods described herein can assess wear for a GET (e.g., tooth on a bucket) of a machine. This capability applies to GETs that degrade through wear that is visually detectable as a change in the shape or appearance of the GET. A GET monitoring system can utilize CNN for detecting individual instances of GETs in an image. The neural network is trained using human annotated or machine generated (synthetic) annotated images. The GET monitoring system performs instance segmentation of a GET using color images, composite color images, depth images, and/or infrared (IR) images. The GET monitoring system can determine the initial state (e.g., damaged, new, missing, etc.) of a GET on a bucket after installation and perform a calibration process. After calibration, the GET monitoring system can estimate how much the GET has worn down since the GET was installed. The GET monitoring system can determine the amount of wear of the GET using segmentation polygon detections of the GET in conjunction with depth measurements from a stereo camera(s) to estimate the current length of the GET. In some embodiments, as a machine operates (e.g., digging, loading, traveling, etc.), the motion of the machine can induce perspective distortion on the captured images of the GETs. The GET monitoring system can correct for perspective distortion, induced by bucket motion, by measuring GET surface area in pixel space. The present systems and methods can be implemented to manage and control maintenance of multiple industrial machines, vehicles and/or other suitable devices such as mining machines, trucks, corporate fleets, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

What is claimed is:

1. A method for determining wear estimation of a machine part, the method comprising:
    determining a first size of the machine part attached to a machine based on a measurement of the machine part;
    receiving at least one image of the machine part captured by at least one camera attached to the machine;
    determining a second size of the machine part by:
        generating a segmentation polygon around the machine part in the at least one image;
        identifying a top midpoint and a bottom midpoint of the segmentation polygon in image pixel-space;
        calculating a distance from the top midpoint to the bottom midpoint; and
    determining a wear estimate of the machine part by comparing the first size to the second size.

2. The method of claim 1, further comprising:
    determining a perspective distortion scaling factor to correct size distortion of the machine part in images as the machine part moves toward and away from the at least one camera,
        wherein the perspective distortion scaling factor is based on a surface area in square pixels of the machine part and a distance of the machine part from the at least one camera; and
    determining the second size of the machine part as a function of the perspective distortion scaling factor.

3. The method of claim 1, further comprising:
    generating an occluded class and an un-occluded class for one or more types of machine parts; and
    training a neural network model to identify occluded machine parts in a plurality of images based on the occluded class and the un-occluded class for the one or more types of machine parts.

4. The method of claim 1, further comprising:
    training a part detection model to identify machine parts based on a plurality of images that include annotated machine parts;
    inputting the at least one image into the trained part detection model; and
    generating the segmentation polygon around the machine part in the at least one image.

5. The method of claim 1, further comprising:
    generating a report of the wear estimate of the machine part, wherein the report includes a wear percentage of the machine part.

6. The method of claim 1, further comprising:
    calibrating a part detection model by capturing images of the machine part at two or more pre-defined positions relative the at least one camera attached to the machine;
    receiving, by the part detection model, a plurality of images in a predetermined time scope;
    identifying, by the part detection model, one or more detections of the machine part in a number of images of the plurality of images; and
    in response to the number of images being above a threshold, determining the one or more detections are positive detections of the machine part.

7. The method of claim 1, wherein the machine part is a ground engaging tool attached to a bucket of the machine, and wherein the first size and the second size of the machine part are a length of the machine part or a surface area of the machine part.

8. A non-transitory computer-readable medium storing instructions that, when executed by a computing system, cause the computing system to perform operations for determining wear estimation of a machine part, the operations comprising:
    determining a first size of the machine part attached to a machine based on a measurement of the machine part;
    receiving at least one image of the machine part captured by at least one camera attached to the machine;
    determining a second size of the machine part by:
        generating a segmentation polygon around the machine part in the at least one image;
        identifying a top midpoint and a bottom midpoint of the segmentation polygon in image pixel-space;
        calculating a distance from the top midpoint to the bottom midpoint; and
    determining a wear estimate of the machine part by comparing the first size to the second size.

9. The non-transitory computer-readable medium of claim 8, wherein the operations further comprise:
    determining a perspective distortion scaling factor to correct size distortion of the machine part in images as the machine part moves toward and away from the at least one camera,
        wherein the perspective distortion scaling factor is based on a surface area in square pixels of the machine part and a distance of the machine part from the at least one camera; and
    determining the second size of the machine part as a function of the perspective distortion scaling factor.

10. The non-transitory computer-readable medium of claim 8, wherein the operations further comprise:
    generating an occluded class and an un-occluded class for one or more types of machine parts; and
    training a neural network model to identify occluded machine parts in a plurality of images based on the occluded class and the un-occluded class for the one or more types of machine parts.

11. The non-transitory computer-readable medium of claim 8, wherein the operations further comprise:
    training a part detection model to identify machine parts based on a plurality of images that include annotated machine parts;
    inputting the at least one image into the trained part detection model; and
    generating the segmentation polygon around the machine part in the at least one image.

12. The non-transitory computer-readable medium of claim 8, wherein the operations further comprise:
    generating a report of the wear estimate of the machine part, wherein the report includes a wear percentage of the machine part.

13. The non-transitory computer-readable medium of claim 8, wherein the operations further comprise:
    calibrating a part detection model by capturing images of the machine part at two or more pre-defined positions relative the at least one camera attached to the machine;
    receiving, by the part detection model, a plurality of images in a predetermined time scope;

identifying, by the part detection model, one or more detections of the machine part in a number of images of the plurality of images; and in response to the number of images being above a threshold, determining the one or more detections are positive detections of the machine part.

14. The non-transitory computer-readable medium of claim 8, wherein the machine part is a ground engaging tool attached to a bucket of the machine, and wherein the first size and the second size of the machine part are a length of the machine part or a surface area of the machine part.

15. A system comprising:

one or more processors; and one or more memories storing instructions that, when executed by the one or more processors, cause the system to perform a process for determining wear estimation of a machine part, the process comprising:

determining a first size of the machine part attached to a machine based on a measurement of the machine part;

receiving at least one image of the machine part captured by at least one camera attached to the machine;

determining a second size of the machine part by:

generating a segmentation polygon around the machine part in the at least one image;

identifying a top midpoint and a bottom midpoint of the segmentation polygon in image pixel-space;

calculating a distance from the top midpoint to the bottom midpoint; and determining a wear estimate of the machine part by comparing the first size to the second size.

16. The system according to claim 15, wherein the process further comprises:

determining a perspective distortion scaling factor to correct size distortion of the machine part in images as the machine part moves toward and away from the at least one camera, wherein the perspective distortion scaling factor is based on a surface area in square pixels of the machine part and a distance of the machine part from the at least one camera; and determining the second size of the machine part as a function of the perspective distortion scaling factor.

17. The system according to claim 15, wherein the process further comprises:

generating an occluded class and an un-occluded class for one or more types of machine parts; and training a neural network model to identify occluded machine parts in a plurality of images based on the occluded class and the un-occluded class for the one or more types of machine parts.

18. The system according to claim 15, wherein the process further comprises:

training a part detection model to identify machine parts based on a plurality of images that include annotated machine parts;

inputting the at least one image into the trained part detection model; and generating the segmentation polygon around the machine part in the at least one image.

19. The system according to claim 15, wherein the process further comprises:

generating a report of the wear estimate of the machine part, wherein the report includes a wear percentage of the machine part, wherein the machine part is a ground engaging tool attached to a bucket of the machine, and wherein the first size and the second size of the machine part are a length of the machine part or a surface area of the machine part.

20. The system according to claim 15, wherein the process further comprises:

calibrating a part detection model by capturing images of the machine part at two or more pre-defined positions relative the at least one camera attached to the machine;

receiving, by the part detection model, a plurality of images in a predetermined time scope;

identifying, by the part detection model, one or more detections of the machine part in a number of images of the plurality of images; and in response to the number of images being above a threshold, determining the one or more detections are positive detections of the machine part.

* * * * *